(12) United States Patent
Pan et al.

(10) Patent No.: US 11,736,331 B2
(45) Date of Patent: Aug. 22, 2023

(54) INFORMATION REPORTING METHOD, INFORMATION PROCESSING METHOD, TERMINAL, AND NETWORK DEVICE

(71) Applicant: VIVO MOBILE COMMUNICATION CO.,LTD., Guangdong (CN)

(72) Inventors: Xueming Pan, Chang'an Dongguan (CN); Xiaodong Shen, Chang'an Dongguan (CN); Zichao Ji, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 136 days.

(21) Appl. No.: 16/638,109

(22) PCT Filed: Aug. 2, 2018

(86) PCT No.: PCT/CN2018/098272
§ 371 (c)(1),
(2) Date: Feb. 10, 2020

(87) PCT Pub. No.: WO2019/029425
PCT Pub. Date: Feb. 14, 2019

(65) Prior Publication Data
US 2020/0244507 A1 Jul. 30, 2020

(30) Foreign Application Priority Data
Aug. 11, 2017 (CN) .......................... 201710687355.6

(51) Int. Cl.
*H04L 27/26* (2006.01)
*H04L 1/00* (2006.01)
(Continued)

(52) U.S. Cl.
CPC ........ *H04L 27/2676* (2013.01); *H04L 1/0038* (2013.01); *H04L 5/001* (2013.01);
(Continued)

(58) Field of Classification Search
CPC .......................... H04L 1/0038; H04J 11/0079
See application file for complete search history.

(56) References Cited

U.S. PATENT DOCUMENTS

| 10,433,318 B2 | 10/2019 | Lee et al. |
| 2009/0168922 A1 | 7/2009 | Malladi et al. |
| (Continued) |

FOREIGN PATENT DOCUMENTS

| CN | 101699901 A | 4/2010 |
| CN | 101843022 A | 9/2010 |
| (Continued) |

OTHER PUBLICATIONS

Chinese Search Report issued in corresponding application No. 201710687355.6, dated Oct. 8, 2019.
(Continued)

*Primary Examiner* — Charles C Jiang
*Assistant Examiner* — Debebe A Asefa
(74) *Attorney, Agent, or Firm* — Maschoff Brennan (57) ABSTRACT

The present disclosure discloses an information reporting method and information determining method, a terminal and a network device. The method includes: determining PDCCH blind decoding capability information of the terminal; wherein the PDCCH blind decoding capability information indicates a maximum processing capability of the terminal to perform blind decoding on the PDCCH within a first unit time and a maximum processing capability of the terminal to perform blind decoding on the PDCCH within a second unit time; the first unit time is greater than the second unit time; reporting the PDCCH blind decoding capability information to a network device. The present disclosure is applied to PDCCH blind decoding.

20 Claims, 4 Drawing Sheets

(51) Int. Cl.
*H04L 5/00* (2006.01)
*H04W 72/12* (2023.01)
*H04W 72/23* (2023.01)

(52) U.S. Cl.
CPC ........ *H04L 5/0053* (2013.01); *H04L 27/2657* (2013.01); *H04W 72/12* (2013.01); *H04W 72/23* (2023.01)

(56) References Cited

U.S. PATENT DOCUMENTS

| | | | |
|---|---|---|---|
| 2015/0189628 A1 | 7/2015 | Pan et al. | |
| 2016/0128028 A1* | 5/2016 | Mallik | H04L 1/0039 370/336 |
| 2017/0374569 A1* | 12/2017 | Lee | H04L 1/1671 |
| 2019/0074936 A1* | 3/2019 | Lee | H04L 5/0048 |
| 2019/0229878 A1* | 7/2019 | Takeda | H04W 72/042 |
| 2020/0305129 A1* | 9/2020 | Lee | H04L 5/0053 |
| 2021/0360610 A1* | 11/2021 | Kim | H04L 5/0094 |

FOREIGN PATENT DOCUMENTS

| | | |
|---|---|---|
| CN | 102056185 A | 5/2011 |
| CN | 102215586 A | 10/2011 |
| CN | 103546233 A | 1/2014 |
| EP | 3 644 642 A1 | 4/2020 |
| WO | 2016/114560 A1 | 7/2016 |
| WO | 2016114560 A1 | 7/2016 |

OTHER PUBLICATIONS

European Search Report issued in corresponding application No. 18845189.2, dated Jul. 22, 2020.

International Search Report and Written Opinion issued in corresponding application No. PCT/CN2018/098272, dated Feb. 20, 2020.

Lenovo, "Discussion on reducing the number of PDCCH blind decoding for Rel-13 eCA", R1-155814, 3rd Generation Partnership Project, Mobile Competence Centre, vol. RAN WG1, No. Malmo, Sweden, Oct. 4, 2015.

ZTE, "PDCCH monitoring for slots and mini-slots", R1-1707162, 3rd Generation Partnership Project, Hangzhou, P.R. China, May 15-19, 2017.

Vivo, " Discussion on search space and blind decoding design", R1-1712847, 3rd Generation Partnership Project,, Prague, Czech Republic, Aug. 21-25, 2017.

ZTE. "PDCCH Monitoring for Slots and Mini-Slots" 3GPP TSG RAN WG1 Meeting #89 R1-1707162, May 6, 2017.

* cited by examiner

INFORMATION REPORTING METHOD, INFORMATION PROCESSING METHOD, TERMINAL, AND NETWORK DEVICE

CROSS-REFERENCE TO RELATED APPLICATION

This application is the U.S. national phase of PCT Application No. PCT/CN2018/098272 filed on Aug. 2, 2018, which claims priority to Chinese Patent Application No. 201710687355.6 filed on Aug. 11, 2017, the disclosures of which are incorporated in their entirety by reference herein.

TECHNICAL FIELD

The present disclosure relates to the field of wireless communication technology, and in particular to an information reporting method, an information processing method, a terminal and a network device.

BACKGROUND

In the $5^{th}$ Generation (5G) mobile communication system, the physical downlink control channel (PDCCH) blind decoding of a terminal is more complicated than the Long Term Evolution (LTE) system. For example, it can be specifically shown in the following examples: Example 1: At present, the New Radio (NR) frame structure design can support two types of service transmission units, i.e., slot and mini-slot; thus, when the terminal performs the PDCCH blind decoding based on network configuration, the slot and/or the mini-slot can be used as the time interval, wherein, for the numerology of an Orthogonal Frequency Division Multiplexing (OFDM), the slot has a length of 7 or 14 OFDM symbols, while the mini-slot has a variable length, the minimum of which is 1 OFDM symbol, and the maximum of which is (the length of slot-1); Example 2: the NR system introduces the concept of multiple control resource sets (CORESETs), and the terminal needs to perform the blind decoding on multiple CORESETs at the same time; Example 3: the NR system supports different types of service such as enhanced Mobile Broadband (eMBB) and ultra Reliable and Low Latency Communication (uRLLC), and the types of the Downlink Control Information (DCI) to be simultaneously detected by the terminal increase potentially.

Thus, the NR PDCCH blind decoding is more complicated than the LTE system due to the various reasons described above, and different terminals have different abilities for processing the PDCCH blind decoding due to implementation architecture, processing capabilities, and so on. Therefore, if all terminals are forced to have the same blind decoding capability through protocols, they will not be able to meet the diversity requirements of services and terminal types.

SUMMARY

In a first aspect, the present disclosure provides an information reporting method applied to a terminal. The method includes:

determining physical downlink control channel (PDCCH) blind decoding capability information of the terminal; wherein the PDCCH blind decoding capability information further indicates a maximum processing capability of the terminal to perform blind decoding on the PDCCH within a first unit time, the PDCCH blind decoding capability information of the terminal is dependent on subcarrier spacing and/or OFDM symbol length of the system which the terminal is communicating with; and reporting the PDCCH blind decoding capability information to a network device.

In a second aspect, the present disclosure provides an information determining method applied to a network device. The method includes:

receiving PDCCH blind decoding capability information reported by a terminal; wherein the PDCCH blind decoding capability information further indicates a maximum processing capability of the terminal to perform blind decoding on the PDCCH within a first unit time, the PDCCH blind decoding capability information of the terminal is dependent on subcarrier spacing and/or OFDM symbol length of the system which the terminal is communicating with; and determining configuration information of the terminal according to the PDCCH blind decoding capability information reported by the terminal; wherein the configuration information is used to instruct the terminal to perform blind decoding on the PDCCH.

In a third aspect, the present disclosure provides a terminal. The terminal includes:

a determination unit for determining PDCCH blind decoding capability information of the terminal; wherein the PDCCH blind decoding capability information further indicates a maximum processing capability of the terminal to perform blind decoding on the PDCCH within a first unit time, the PDCCH blind decoding capability information of the terminal is dependent on subcarrier spacing and/or OFDM symbol length of the system which the terminal is communicating with; and a sending unit for reporting the PDCCH blind decoding capability information to a network device.

In a fourth aspect, the present disclosure provides a network device. The network device includes:

a reception unit for receiving PDCCH blind decoding capability information reported by a terminal; wherein the PDCCH blind decoding capability information further indicates a maximum processing capability of the terminal to perform blind decoding on the PDCCH within a first unit time, the PDCCH blind decoding capability information of the terminal is dependent on subcarrier spacing and/or OFDM symbol length of the system which the terminal is communicating with; and a determination unit for determining configuration information of the terminal according to the PDCCH blind decoding capability information reported by the terminal; wherein the configuration information is used to instruct the terminal to perform blind decoding on the PDCCH.

In a fifth aspect, the present disclosure provides a terminal. The terminal includes a processor, a storage, and a program stored on the storage and capable of running on the processor, wherein the processor implements, when executing the program, the steps of the information reporting method provided by the first aspect.

In a sixth aspect, the present disclosure provides a computer readable storage medium. The computer readable storage medium stores thereon a program which implements, when executed by a processor, the steps of the information reporting method provided by the first aspect.

In a seventh aspect, the present disclosure provides a network device. The network device includes a processor, a storage, and a program stored on the storage and capable of running on the processor, wherein the processor implements, when executing the program, the steps of the information determining method provided by the second aspect.

In an eighth aspect, the present disclosure provides a computer readable storage medium. The computer readable storage medium stores thereon a program which implements, when executed by a processor, the steps of the information determining method provided by the second aspect.

BRIEF DESCRIPTION OF THE DRAWINGS

In order to describe the technical solutions of the embodiments of the present disclosure more clearly, the drawings used in the description of the embodiments of the present disclosure are briefly introduced below. Obviously, the drawings in the following description are only some embodiments of the present disclosure. For those of ordinary skill in the art, other drawings can be obtained based on these drawings without paying creative labor.

DETAILED DESCRIPTION

The exemplary embodiments of the present disclosure may be described hereinafter in more details with reference to the accompanying drawings. Although exemplary embodiments of the present disclosure are shown in the drawings, it should be understood that the present disclosure can be implemented in various forms and should not be limited by the embodiments set forth herein. On the contrary, these embodiments are provided to enable a thorough understanding of the present disclosure, and to fully convey the scope of the present disclosure to those skilled in the art.

The technical solutions provided by the present disclosure can be applied to various communication systems, such as 5G communication systems, future evolution systems, or various communication convergence systems, and so on. Various application scenarios may be included, such as Machine To Machine (M2M), D2M, macro communication, enhance Mobile Broadband (eMBB), ultra Reliable and Low Latency Communication (uRLLC), massive Machine Type Communication (mMTC), and so on. These scenarios include, but are not limited to, scenarios such as communication between terminals, or communication between network devices, or communication between a network device and a terminal, etc. The embodiments of the present disclosure can be applied to communication between a network device and a terminal, or communication between terminals, or communication between network devices in a 5G communication system.

Figure 1:
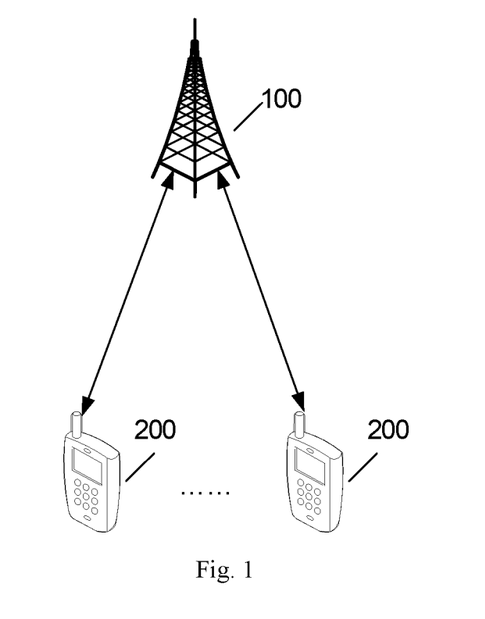
FIG. 1 is an architecture diagram of a communication system to which a technical solution provided by an embodiment of the present disclosure is applicable.

FIG. 1 shows a schematic diagram of a possible structure of a communication system according to an embodiment of the present disclosure. As shown in FIG. 1, the communication system includes at least one network device 100 (only one is shown in FIG. 1) and one or more terminals 200 to which each network device 100 is connected. The above network device 100 may be a base station, a core network device, a Transmission Reference Point (TRP), a relay station, or an access point. The network device 100 may be a Base Transceiver Station (BTS) in a Global System for Mobile Communication (GSM) or Code Division Multiple Access (CDMA) network, or may be a NodeB (NB) in Wideband Code Division Multiple Access (WCDMA), or may also be an eNB or evolutional NodeB (eNodeB) in LTE. The network device 100 may also be a wireless controller in a Cloud Radio Access Network (CRAN) scenario. The network device 100 may also be a network device in a 5G communication system or a network device in a future evolution network; it may also be a wearable device or a vehicle-mounted device, or the like.

The terminal 200 may be a wireless terminal or a wired terminal. The wireless terminal may be a device that provides voices and/or other service data connectivity to the user, a handheld device or a computing device with a wireless communication function or other processing device connected to a wireless modem, an in-vehicle device, a wearable device, a terminal in a future 5G network, or a terminal in a future evolution PLMN network. A wireless terminal may communicate with one or more core networks via a Radio Access Network (RAN). The wireless terminal may be a mobile terminal, such as a mobile phone (or a "cellular" phone) and a computer with a mobile terminal. For example, it can be a portable, compact, handheld, computer-built or in-vehicle mobile device that exchanges language and/or data with the radio access network, as well as a Personal Communication Service (PCS) phone, a cordless phone, a Session Initiation Protocol (SIP) phone, a Wireless Local Loop (WLL) station, a Personal Digital Assistants (PDA), and so on. The wireless terminal may also be a mobile device, a User Equipment (UE), a UE terminal, an access terminal, a wireless communication device, a terminal unit, a terminal station, a mobile station, a Mobile, a remote station, a distant station, a remote terminal, a subscriber unit, a subscriber station, a user agent, a terminal device, etc. The above are just examples, and practical applications are not limited to hereto.

In the following, some terms involved in this disclosure are explained to facilitate the reader's understanding:

1. Control Information

For example, downlink control indicator (DCI). In the LTE system, a downlink control channel (PDCCH) is sent in a downlink subframe, and a multiplexing relationship of time division multiplexing (TDM) is formed between the PDCCH and the Physical Downlink Shared Channel (PDSCH). The PDCCH is sent through the first 1-3 Orthogonal Frequency Division Multiplexing (OFDM) symbol(s) of a downlink subframe. Generally, the basic unit of the time-frequency resource of the DCI carried on the PDCCH is also a Control Channel Element (CCE). The DCI may be transmitted by using different Aggregation Levels (AL). The aggregation level refers to how many CCEs on which the DCI is carried. The aggregation level may be, for example, but not limited to, 1, 2, 4, 8, 16, 32, and the like. For example, an aggregation level of 2 means that the DCI is carried on 2 CCEs.

A CCE includes, for example, but not limited to, 6 Resource Element Groups (REGs). These 6 REGs may be constructed collectively when constructing a CCE, or may be constructed distributedly, which is not limited here. By way of example, 12 consecutive REs (which does not include the RE occupied by a reference signal) constitute one REG. wherein, the RE is the smallest time-frequency resource unit. The RE can be uniquely identified by an index pair (k, l), where k is a subcarrier index, and l is a symbol index.

2. PDCCH Blind Decoding

As described above, the DCI may be transmitted in the first 1-3 OFDM symbols of one subframe, and may be transmitted by different aggregation levels. However, since the PDCCH is an instruction sent by a base station, and the UE has not received any information other than some system information before this, the UE does not know the number, location, DCI format of the CCEs that it occupies, and the aggregation level of the DCI. Therefore, the UE needs to detect the possible time-frequency resource location and aggregation level of the DCI through blind decoding so as to receive the DCI. That is, the UE uses the blind decoding manner to detect a downlink control channel (PDCCH) sent by the base station to obtain the downlink control information (DCI).

It should be noted that the UE needs to perform the control channel blind decoding for each non-DRX downlink subframe.

In order to reduce the complexity of blind decoding of the UE, two search spaces are defined in the LTE system, i.e., the Common Search Space (CSS) and the UE-specific Search Space (UESS). The unit of size of the search space is the number of the CCEs. The CSS is mainly used to transmit the DCI for scheduling cell-specific control information (for example, system information, paging messages, multicast power control information, etc.), and each user needs to search; while the UESS is mainly used to transmit the DCI for the scheduling of UE resources. As for the CSS, the CSS in each downlink subframe includes the first 16 CCEs, and the aggregation level of the PDCCH may be 4, 8. Therefore, when a user searches the common search space, he/she searches 4 times according to that the AL is 4 and then searches twice according to that the AL is 8, from CCE 0. As for the UCSS, since the starting CCE position of the UCSS of each UE in each downlink subframe is related to the number of subframes, the RNTI of the UE, etc., the search starting point of each UE is different, that is, the PDCCH aggregation level for the UCSS may be 1, 2, 4, 8, wherein searching is performed 6 times for that AL is 1, 6 times for that AL is 2, twice for that AL is 4, and twice for that AL is 8.

In summary, if the number of blind decodings when the aggregation level is L is represented by a table, the LTE prescribes that, for UCSS, when L={1,2,4,8}, the number of blind decodings are {6,6,2,2} respectively; for CSS, when L={4,8}, the number of blind decodings are {4,2} respectively. For details, please refer to the following table 1, which shows a correspondence table of the search space and the number of attempts of blind decoding that a UE needs to perform blind detection in a downlink subframe. The number of attempts of blind decoding indicates the number of PDCCH candidates.

TABLE 1

| | Search Space | | |
| Type | Aggregation Level | Size of Search Space | Number of blind decodings |
| --- | --- | --- | --- |
| UE-specific Search Space (UESS) | 1 | 6 | 6 |
| | 2 | 12 | 6 |
| | 4 | 8 | 2 |
| | 8 | 16 | 2 |
| Common Search Space (CSS) | 4 | 16 | 4 |
| | 8 | 16 | 2 |

From Table 1 it can be seen that, the number of searches is 6 for the CSS, and 16 for the UCSS. In the UCSS, the DCI format that the UE is in at the same moment has only two types of payload sizes, so it needs to search twice, that is, 32 times in total. When the UE performs blind decoding in the PDCCH search space, it only attempts to decode the DCI that is possible to occur, not to match all DCI formats.

3. Other Terms

The term "and/or" is only a kind of association relationship describing related objects, which means that there may be three kinds of relationships; for example, A and/or B may mean there are following three cases: A exists alone, A and B exist simultaneously, and B exists alone. In addition, the character "l" herein generally indicates that the related objects have an "or" relationship; in a formula, the character "l" indicates that the related objects have a "dividing" relationship. If not specified, "multiple" herein means two or more.

In order to facilitate a clear description of the technical solutions of the embodiments of the present disclosure, in the embodiments of the present disclosure, words such as "first" and "second" are used to distinguish the same or similar items that have substantially the same function or effect. A person skilled in the art can understand that the words "first", "second" and the like do not limit the quantity and execution order.

It should be noted that, in the embodiments of the present disclosure, words such as "exemplary" or "for example" are used as an example, illustration, or description. Any embodiment or design described as "exemplary" or "for example" in the embodiments of the present disclosure should not be construed as more desirable or advantageous than other embodiments or designs. Rather, the use of the words "exemplary" or "for example" is intended to present the relevant concept in a concrete manner.

Figure 2:
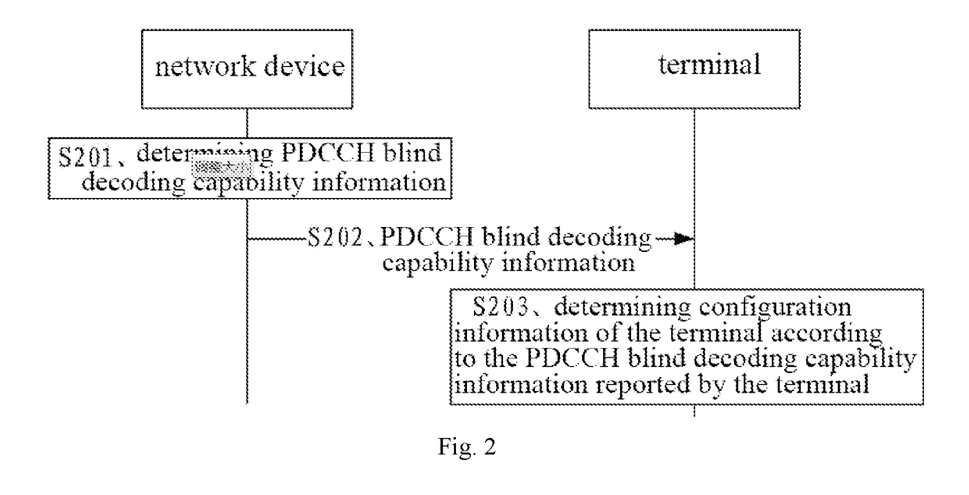
FIG. 2 is a schematic flowchart of an information reporting and information determining method according to an embodiment of the present disclosure.

FIG. 2 is a schematic flowchart of an information reporting method according to an embodiment of the present disclosure. As shown in FIG. 2, the method includes steps S201 to S203.

S201, a terminal determines PDCCH blind decoding capability information of the terminal.

S202, the terminal reports the PDCCH blind decoding capability information to a network device.

The PDCCH blind decoding capability information in the present disclosure indicates a maximum processing capability of the terminal to perform blind decoding on the PDCCH within a first unit time T1 and a maximum processing capability that the terminal performs blind decoding on the PDCCH within a second unit time T2. In the present disclosure, the first unit time is greater than the second unit time. Exemplarily, the first unit time in the present disclosure includes at least one of: at least one slot, at least one subframe, and an absolute time unit (e.g., 1 ms). The second unit time in the present disclosure includes at least one of: at least one mini-slot, and at least one OFDM symbol.

It should be noted that, the mini-slot is a terminology of the 5G (NR) system, and a corresponding term in the LTE-A system is sTTI, that is, the second unit time in the present disclosure may be at least one sTTI.

In an example, the PDCCH blind decoding capability information is used to indicate a maximum number X1 of blind decodings that the terminal performs blind decoding on the PDCCH within the first unit time T1 and a maximum number X2 of blind decodings that the terminal performs blind decoding on the PDCCH within the second unit time T2, where the number X1 of blind decodings> the number X2 of blind decodings. It should be noted that, the number of blind decodings performed by the terminal on the PDCCH within each unit time should not exceed the peak value of the maximum blind decoding number (i.e., X1 and X2 as mentioned above).

Figure 3:
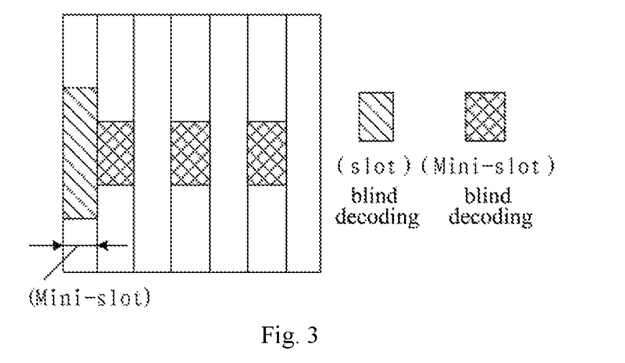
FIG. 3 is a schematic diagram of a slot and a mini-slot according to an embodiment of the present disclosure.

For example, referring to the schematic diagram of the resource scheduling of the slot and mini-slot shown in FIG. 3, one slot contains 7 OFDM symbols, and one mini-slot contains 1 OFDM symbol, wherein the first unit time T1 has a length of one slot, the maximum number X1 of blind decodings that the terminal performs blind decoding on the PDCCH in one slot is 50; the second unit time T2 has a length of one mini-slot, and the maximum number X2 of blind decodings that the terminal performs blind decoding on the PDCCH in one mini-slot is 20.

Exemplarily, the above numbers of blind decodings X1 and X2 are the number of times that the terminal attempts to decode one or more types of DCI in the PDCCH candidates requiring blind decoding. Example 1: since the existing search spaces includes two types: the common search space and the dedicated search space, the PDCCH candidates requiring blind decoding may belong to the common search space and/or the dedicated search space, thus, the above number of blind decodings includes but is not limited to: the number of blind decodings that the terminal performs PDCCH blind decoding on the common search space and/or the number of blind decodings that the terminal performs PDCCH blind decoding on the UE-specific search space. Example 2: the number of blind decodings performed by the terminal in the slot is different from that in the mini-slot, thus, the above number of blind decodings includes but is not limited to: slot-based PDCCH blind decoding number and/or mini-slot-based PDCCH blind decoding number.

It should be noted that, the PDCCH blind decoding capability of the terminal to be reported is not limited to the number of blind decoding reported directly, but may also be other information, such as but not limited to: the number of DCI formats that the terminal can handle, the number of PDCCH candidates, and so on; as long as the information can reflect the PDCCH blind decoding capability of the terminal, it can be reported to the network side. The above-mentioned maximum number of blind decodings is only an example, and the reported information is not limited in the present disclosure.

Optionally, the PDCCH blind decoding capability information of the terminal in the present disclosure may be related to or independent of the PDCCH aggregation level.

In a case that the PDCCH blind decoding capability information of the terminal is dependent on the PDCCH aggregation level, PDCCH aggregation levels are differentiated, and the PDCCH blind decoding capability information of the terminal is defined directly on the PDCCH aggregation level, so that the maximum processing capability that the terminal performs blind decoding on the PDCCH at different aggregation levels is defined for the terminal. Here, it should be noted that, the maximum processing capability that the terminal performs blind decoding on the PDCCH at a certain aggregation level, or the maximum processing capabilities that the terminal performs blind decoding on the PDCCH at various aggregation levels may be defined, which is not limited. Exemplarily, the PDCCH blind decoding capability information of the terminal is used to indicate the maximum number of blind decodings that the terminal is capable at different aggregation levels.

In a case that the PDCCH blind decoding capability information of the terminal is independent of the PDCCH aggregation level, PDCCH aggregation levels are not differentiated, and the maximum processing capabilities that the terminal performs blind decoding on the PDCCH at various aggregation levels are identical, that is, the blind decodings for different PDCCH aggregation levels are handled according to the same terminal processing capability.

Optionally, the PDCCH blind decoding capability information of the terminal in the present disclosure is dependent on the processing delay capability information of the terminal.

The above processing delay capability information of the terminal is used to indicate a processing capability of the terminal for processing downlink data and/or a processing capability of the terminal for processing uplink scheduling information. Exemplarily, the above processing capability of the terminal for processing downlink data is used to indicate a downlink data processing time of the terminal, and the above processing capability of the terminal for processing uplink scheduling information is used to indicate an uplink scheduling information processing time of the terminal. In an example, the above processing delay capability information of the terminal includes a minimum time interval between a downlink signal reception and the corresponding uplink feedback which are processed by the terminal, and/or, a minimum time interval between an uplink scheduling and the corresponding uplink signal transmission which are processed by the terminal.

Exemplarily, the current progress of the NR standard may define the downlink data processing time of the terminal and the uplink scheduling processing time of the terminal:

1) the downlink data processing time N1: it may be defined as a time interval between an end timing when the terminal receives the Physical Downlink Shared Channel (PDSCH) and a start timing when the UE can feed back at the earliest an ACK/NACK related to this PDSCH. The unit of time interval is OFDM symbol. N1 includes the PDCCH blind decoding processing time, the PDSCH decoding processing time, and the ACK/NACK encoding processing time.

2) the uplink scheduling processing time N2: it may be defined as a time interval between an end timing when the terminal receives UL grant and a start timing when the UE can send at the earliest a Physical Uplink Shared Channel (PUSCH) related to this UL grant. N2 includes the PDCCH blind decoding processing time and the PUSCH encoding processing time.

When the processing delay capability of the terminal changes, the corresponding downlink data processing time N1 and uplink scheduling processing time N2 of the terminal will also change, thereby causing the PDCCH blind decoding capability of the terminal to change. For example, when the downlink data processing time of the terminal is N1, the maximum number of blind decodings that the terminal is capable in the unit time T1 is X1; and when the downlink data processing time is N1', the maximum number of blind decodings that the terminal is capable in the unit time T1 is X1'.

For example, taking that T2=1 OFDM symbol as an example, when the processing delay capability of the terminal requires that the downlink data processing time N1=6 OFDM symbols, the maximum number of PDCCH blind decodings that the terminal can support within the time T2 is X2=10 times; when the processing delay capability of the terminal requires that the downlink data processing time N1=3 OFDM symbols, the maximum number of PDCCH blind decodings that the terminal can support within the time T2 is X2=6 times. It should be noted that, although only T2 is used as an example here, in addition to this, the number of PDCCH blind decodings X1 supported by the terminal within the time T1 may also be related to the processing time N1. An object that may be effected by the processing delay capability is not limited here.

The time interval in the present disclosure may be represented by at least one of: the number of orthogonal frequency division multiplexings (OFDMs), the number of mini-slots, the number of slots, and the number of sub-frames.

Optionally, the PDCCH blind decoding capability information of the terminal in the present disclosure is related to a subcarrier spacing and/or OFDM symbol length of the system which the terminal is communicating with.

The subcarrier spacing of the system may affect the length of the OFDM symbol in the subcarrier, and the latter may in turn effect the data processing time of the terminal. For example, when the subcarrier spacing of the system in which the terminal is located is SCS1, the corresponding OFDM symbol has a length L1, and the maximum number of PDCCH blind decodings supported by the terminal within the unit time T2 is X2; when the subcarrier spacing of the system in which the terminal is located is SCS1', the corresponding OFDM symbol has a length L1', and the maximum number of PDCCH blind decodings supported by the terminal within the unit time T2 is X2'.

For example, taking that T2=1 OFDM symbol as an example, when the system employs a subcarrier spacing of 15 kHz, the maximum number of PDCCH blind decodings that can be supported by the terminal within the time T2 is X2=10 times; when the system employs a subcarrier spacing of 60 kHz, the length of the OFDM symbol is 1/4 of that in the case of the subcarrier spacing of 15 kHz, and the effective processing time left for the terminal is shortened, resulting in a decrease in the maximum number of PDCCH blind decodings supported by the terminal within the time T2, and the number of PDCCH blind decodings that can be supported by the terminal within the time T2 is only X2=4 times.

It should be noted that, although only T2 is used as an example here, in addition to this, the number of PDCCH blind decodings X1 supported by the terminal within the time T1 may also be related to the subcarrier spacing, and an object that may be effected by the subcarrier spacing is not limited here.

The above steps S201 and S202 are the process of reporting the blind decoding capability of the terminal. The present disclosure can define different terminal PDCCH blind decoding capacities for different terminals in a system (such as, but not limited to, a 5G NR system or an LTE-A system) according to different service requirements or terminal cost requirements, so that when the terminal reports its own PDCCH blind decoding capability information to the network side, the network device can reasonably configure the terminal blind decoding behavior according to the actual PDCCH blind decoding capability of the terminal.

S203, the network device determining configuration information of the terminal according to the PDCCH blind decoding capability information reported by the terminal.

The above configuration information is used to instruct the terminal to perform blind decoding on the PDCCH, and the network device clearly notifies the terminal of the terminal blind decoding behavior by the configuration information. Exemplarily, the above configuration information includes at least one of: time resource information of PDCCH blind decoding, frequency domain resource information, DCI format information, PDCCH candidate number information, and PDCCH aggregation level information.

The above step S203 is the determination process of the configuration information of the PDCCH blind decoding. After receiving the PDCCH blind decoding capability information reported by the terminal, the network side may configure accurate configuration information for the terminal according to the PDCCH blind decoding capability information reported by the terminal, thereby configuring reasonable terminal blind decoding behaviors for different terminals to support diverse terminal capabilities and adapt to different actual requirements.

After the above steps S201 to S203, that is, after the reporting of the terminal PDCCH blind decoding capability and the determining of the configuration information are completed, the present disclosure may perform the following configuration process of the PDCCH blind decoding configuration information.

Figure 4:
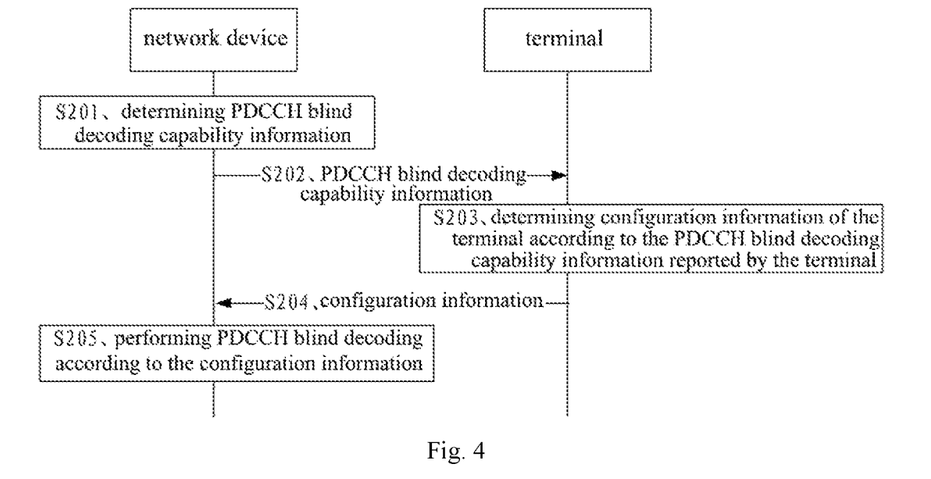
FIG. 4 is a schematic flowchart of another information reporting and information determining method according to an embodiment of the present disclosure.

As shown in FIG. 4, the method further includes steps S204 and S205.

S204, the network device sends configuration information to the terminal.

S205, the terminal performs the PDCCH blind decoding according to the configuration information of PDCCH blind decoding.

It should be noted that the above configuration information includes the configuration information instructing the terminal to perform a specific blind decoding behavior, that is, the specific blind decoding behavior to be notified to the terminal is clearly included in the configuration information. Therefore, the configuration information does not directly include the numbers of blind decodings for various unit times, and the terminal may obtain the specific numbers of blind decodings based on the configuration information after receiving the configuration information.

Figure 5:
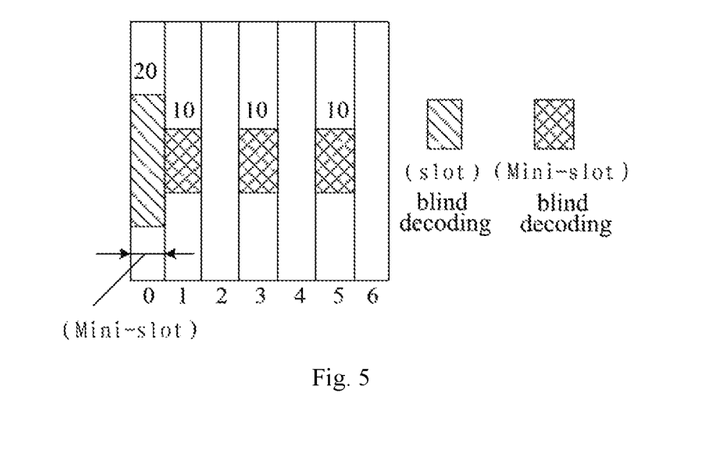
FIG. 5 is a schematic diagram of resource scheduling of a slot and a mini-slot according to an embodiment of the present disclosure.

For example, as shown in FIG. 5, the system takes the subcarrier spacing of 15 kHz as an example, in which the length of one slot is 0.5 ms, including 7 OFDM symbols, and one mini-slot includes 1 OFDM symbol. The first unit time T1 has a length of one slot, and the maximum number of blind decodings X1 performed on the PDCCH within one slot that is reported by the terminal is 50 times; the second unit time T2 has a length of one mini-slot, i.e., one OFDM symbol length, and the maximum number of blind decodings X1 performed on the PDCCH within one mini-slot that is reported by the terminal is 20 times. In other words, the blind decoding capability of a terminal within one slot is not proportional to the number of OFDM symbols. The terminal can support a maximum of 20 times of blind decoding peaks in one OFDM symbol, but the entire slot can support only 50 times of blind decodings. After the terminal reports the information to the base station, the base station configures the blind decoding behavior of the terminal within one slot according to the information, such as configuring a period for blind decoding of the PDCCH (for example, performing blind decoding on the PDCCH every one or more OFDM symbols, or every one or more slots). After the network device feeds back the configured configuration information to the terminal, the terminal determines the configuration that the network configures for the terminal according to the configuration information as follows: as shown in FIG. 5, the terminal performs 20 PDCCH blind decodings on symbol #0 in one slot, and 10 blind decodings on each of symbols {#1, #3, #5}, making full use of the blind decoding capability of the terminal.

In addition, since what is detected by the blind decoding performed by the terminal is control information carried on the PDCCH, the method further includes: sending the control information to the terminal on the PDCCH candidates on which blind decoding is to be performed by the terminal; wherein the control information includes, but is not limited to DCI.

In the foregoing, the solutions provided by the embodiments of the present disclosure are mainly introduced from the perspective of interaction between a network device and a terminal. It will be appreciated that, in order to implement the foregoing functions, each of the foregoing network device or terminal includes hardware structures and/or software modules corresponding to respective functions. Those skilled in the art should easily realize that, in conjunction with the algorithm steps of the examples described in the embodiments disclosed herein, the present disclosure can be implemented in hardware or a combination of hardware and computer software. Whether a certain function is performed by hardware or computer software-driven hardware depends on the specific application and design constraints of the technical solution. Professionals may implement the described functions in varying ways for specific applications, but such implementations should not be considered to go beyond the scope of the present disclosure.

The embodiments of the present disclosure may divide the functional modules of the network device and the terminal according to the foregoing method example. For example, the functional modules may be divided such that each functional module corresponds to each function, or two or more functions may be integrated into one processing module. The above integrated modules can be implemented in the form of hardware or software functional modules. It should be noted that the division of the modules in the embodiments of the present disclosure is schematic, and is only a logical function division. There may be other division manner in actual implementation.

Figure 6:
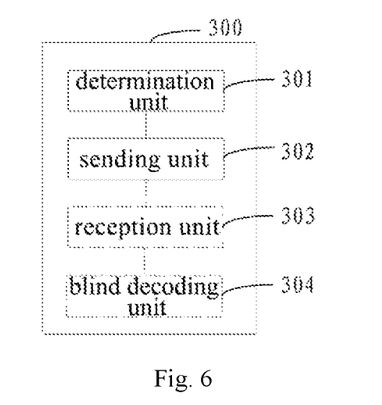
FIG. 6 is a schematic structural diagram of a terminal according to an embodiment of the present disclosure.

In the case that the functional modules is divided such that each functional module corresponds to each function, FIG. 6 shows a schematic diagram of a possible structure of the terminal provided by the present disclosure. As shown in FIG. 6, the terminal 300 may include: a determination unit 301 and a sending unit 302, wherein:

the determination unit 301 is configured to determine the PDCCH blind decoding capability information of the terminal; wherein the PDCCH blind decoding capability information further indicates a maximum processing capability of the terminal to perform blind decoding on the PDCCH within a first unit time and a maximum processing capability that the terminal performs blind decoding on the PDCCH within a second unit time; the first unit time is greater than the second unit time;

the sending unit 302 is configured to report the PDCCH blind decoding capability information to a network device.

Optionally, as shown in FIG. 6, the terminal 300 further includes:

a reception unit 303 which is configured to receive configuration information sent by the network device; wherein the configuration information is used to instruct the terminal to perform PDCCH blind decoding, and the configuration information includes at least one of: time resource information of PDCCH blind decoding, frequency domain resource information, DCI format information, PDCCH candidate number information, and PDCCH aggregation level information; and a blind decoding unit which is configured to perform PDCCH blind decoding according to the configuration information of PDCCH blind decoding.

Optionally, the PDCCH blind decoding capability information is used to indicate the maximum number of blind decodings that the terminal is capable within the first unit time, and the maximum number of blind decodings that the terminal is capable within the second unit time.

Optionally, the first unit time includes at least one of: at least one slot, at least one subframe, and an absolute time unit.

Optionally, the second unit time includes at least one of: at least one mini-slot, and at least one OFDM symbol.

Optionally, the PDCCH blind decoding capability information of the terminal is dependent on the processing delay capability information of the terminal; wherein the processing delay capability information of the terminal is: a minimum time interval between a downlink signal reception and the corresponding uplink feedback which are processed by the terminal, and/or, a minimum time interval between an uplink scheduling and the corresponding uplink signal transmission which are processed by the terminal.

Further optionally, the time interval includes at least one of: the number of orthogonal frequency division multiplexings (OFDMs), the number of mini-slots, the number of slots, and the number of subframes.

Optionally, the PDCCH blind decoding capability information of the terminal is dependent on subcarrier spacing and/or OFDM symbol length of the system which the terminal is communicating with.

It should be noted that the functional descriptions of all the functional modules can refer to relevant contents of corresponding steps involved in the above method embodiment, and will not be repeated here.

An embodiment of the present disclosure further provides a terminal which includes a processor, a storage, and a program stored on the storage and capable of running on the processor, the computer program implements, when executed by the processor, the processes of the above information reporting method and can achieve the same technical effects, which will not be repeated here in order to avoid repetition.

An embodiment of the present disclosure further provides a computer readable storage medium which stores thereon a program, the program implements, when executed by a processor, the processes of the above information reporting method and can achieve the same technical effects, which will not be repeated here in order to avoid repetition. The computer readable storage medium may be a Read-Only Memory (ROM), a Random Access Memory (RAM), a magnetic disk or an optical disk.

Figure 7:
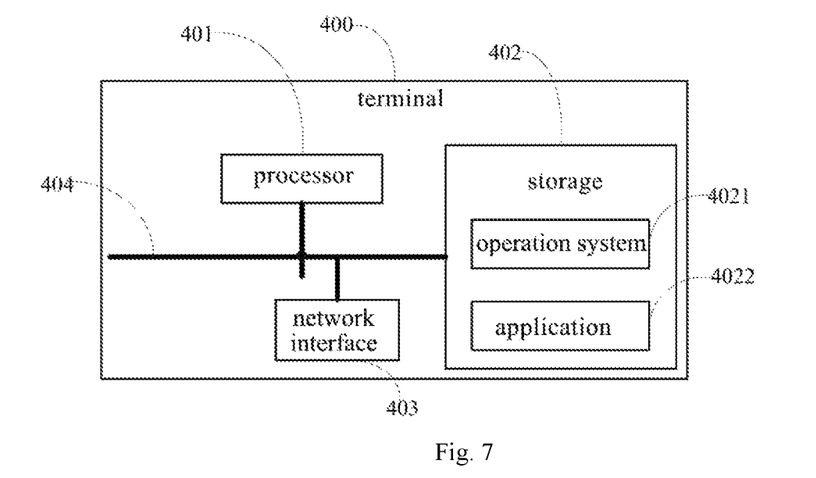
FIG. 7 is a schematic structural diagram of another terminal according to an embodiment of the present disclosure.

An embodiment of the present disclosure further provides a terminal with an integrated unit. FIG. 7 is a block diagram of a terminal according to another embodiment of the present disclosure. The terminal 400 shown in FIG. 7 includes at least one processor 401, a storage 402 and at least one network interface 403. The components in the terminal 400 are coupled to each other by a bus system 404. It will be appreciated that, the bus system 404 is used to achieve the connection communication between these components. The bus system 405 includes a power bus, a control bus, and a status signal bus in addition to the data bus. However, for the sake of clarity, all the buses are marked as the bus system 404 in FIG. 7.

It will be appreciated that the storage 402 in the embodiment of the present disclosure may be a volatile memory or a non-volatile memory, or may include both volatile and non-volatile memories. Among them, the non-volatile memory may be a ROM, a programmable ROM (PROM), an Erasable PROM (EPROM), an Electrically EPROM (EEPROM) or a flash. The volatile memory may be a Random Access Memory (RAM), which is used as an external cache. By way of example, but not limitation, many forms of RAMs are available, such as a Static RAM (SRAM), a Dynamic RAM (DRAM), a Synchronous DRAM (SDRAM), a Double Data Rate SDRAM (DDRS-DRAM), an Enhanced SDRAM (ESDRAM), a Synchlink DRAM (SLDRAM) and a Direct Rambus RAM (DRRAM). The storage 402 of the system and method described in the embodiments of the present disclosure is intended to include, but is not limited to, these and any other suitable types of memories.

In some implementations, the storage 402 stores elements, executable modules or data structures, or a subset thereof, or an extension set thereof: an operation system 4021 and an application 4022.

The operation system 4021 includes various system programs, such as a framework layer, a core library layer, and a driver layer, and is used to implement various basic services and process hardware-based tasks. The application 4022 includes various applications, such as a media player, a browser, and the like, and is used to implement various application services. A program for implementing the method of the embodiment of the present disclosure may be included in the application 4022.

In the embodiment of the present disclosure, the terminal 400 further includes a computer program stored on the storage 402 and capable of running on the processor 401. The computer program implements, when executed by the processor 401, the following steps:

Step 1: determining PDCCH blind decoding capability information of the terminal; wherein the PDCCH blind decoding capability information further indicates a maximum processing capability of the terminal to perform blind decoding on the PDCCH within a first unit time and a maximum processing capability that the terminal performs blind decoding on the PDCCH within a second unit time; the first unit time is greater than the second unit time;

Step 2: reporting the PDCCH blind decoding capability information to a network device.

The method disclosed by the above embodiment of the present disclosure may be applied in the processor 401, or is implemented by the processor 401. The processor 401 may be an integrated circuit chip having a signal processing capability. In the implementation process, the steps of the above method may be performed by using hardware integrated logic circuits or instructions in the form of software in the processor 401. The above processor 401 may be a general-purpose processor, a Digital Signal Processor (DSP), an Application Specific Integrated Circuit (ASIC), a Field Programmable Gate Array (FPGA), or other programmable logic devices, discrete gate or transistor logic devices, discrete hardware components. Various methods, steps, and logical block diagrams disclosed in the embodiments of the present disclosure may be implemented or executed. The general-purpose processor may be a microprocessor or the processor may be any conventional processor or the like. The steps of the method disclosed in combination with the embodiments of the present disclosure may be directly performed by a hardware decoding processor, or may be performed by a combination of hardware and software modules in the decoding processor. The software modules may be located in a mature computer-readable storage medium in the art, such as a random access memory, a flash memory, a read-only memory, a programmable read-only memory, or an electrically erasable programmable memory, a register, and the like. The computer readable storage medium is located in the storage 402, and the processor 401 reads the information in the storage 402 and completes the steps of the above method in combination with its hardware. Specifically, a computer program is stored on the computer readable storage medium, and when the computer program is executed by the processor 401, the steps of the information reporting method embodiment described above are implemented.

It will be appreciated that these embodiments described in the embodiments of the present disclosure may be implemented by hardware, software, firmware, middleware, microcodes, or a combination thereof. For hardware implementation, the processing unit may be implemented in one or more ASICs, DSPs, Digital Signal Processing Devices (DSPDs), Programmable Logic Devices (PLDs), FPGAs, general-purpose processors, controllers, microcontrollers, microprocessors, other electronic units for performing the functions described in this disclosure, or a combination thereof.

For software implementation, the techniques described in the embodiments of the present disclosure may be implemented by modules (such as processes, functions, and the like) that perform the functions described in the embodiments of the present disclosure. Software codes may be stored in a storage and executed by a processor. The storage may be implemented in the processor or external to the processor.

Optionally, when executed by the processor 401, the program may further implement the following steps:

Step 3: receiving configuration information sent by the network device; wherein the configuration information is used to instruct the terminal to perform PDCCH blind decoding, and the configuration information includes at least one of: time resource information of PDCCH blind decoding, frequency domain resource information, DCI format information, PDCCH candidate number information, and PDCCH aggregation level information; and Step 4: performing PDCCH blind decoding according to the configuration information of PDCCH blind decoding.

Optionally, the PDCCH blind decoding capability information further indicates a maximum processing capability of the terminal to perform blind decoding on the PDCCH within a first unit time and a maximum processing capability that the terminal performs blind decoding on the PDCCH within a second unit time; the first unit time is greater than the second unit time.

Optionally, the first unit time includes at least one of: at least one slot, at least one subframe, and an absolute time unit.

Optionally, the second unit time includes at least one of: at least one mini-slot, and at least one OFDM symbol.

Optionally, the PDCCH blind decoding capability information of the terminal is dependent on the processing delay capability information of the terminal; wherein the processing delay capability information of the terminal is: a minimum time interval between a downlink signal reception and the corresponding uplink feedback which are processed by the terminal, and/or, a minimum time interval between an uplink scheduling and the corresponding uplink signal transmission which are processed by the terminal.

Further optionally, the time interval includes at least one of: the number of OFDMs, the number of mini-slots, the number of slots, and the number of subframes.

Optionally, the PDCCH blind decoding capability information of the terminal is dependent on subcarrier spacing and/or OFDM symbol length of the system which the terminal is communicating with.

For the analysis of the related contents in Steps 1 to 3 above, reference may be made to the foregoing method embodiment, and details thereof are not repeated here. In addition, the terminal 400 can implement various processes implemented by the terminal in the foregoing embodiment. To avoid repetition, details are not described here again.

In the embodiment of the present disclosure, different terminal PDCCH blind decoding capabilities are defined for different terminals according to different service requirements or terminal cost requirements. In this way, when a terminal reports its own PDCCH blind decoding capability information to the network side, the network side can learn the accurate PDCCH blind decoding capability of the corresponding terminal so that the network device can configure a reasonable blind decoding behavior of the terminal according to the actual PDCCH blind decoding capability of the terminal.

Figure 8:
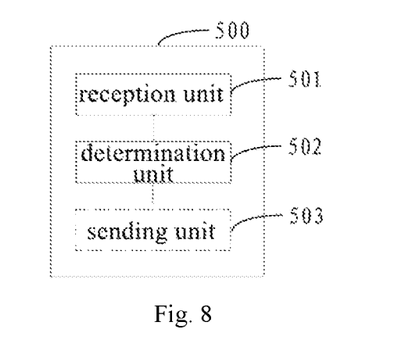
FIG. 8 is a schematic structural diagram of a network device according to an embodiment of the present disclosure.

In the case that the functional modules is divided such that each functional module corresponds to each function, FIG. 8 shows a schematic diagram of a possible structure of the network device provided by the present disclosure. As shown in FIG. 8, the terminal 500 may include: a reception unit 501 and a determination unit 502, wherein:

the reception unit 501 is configured to receive PDCCH blind decoding capability information reported by a terminal; wherein the PDCCH blind decoding capability information further indicates a maximum processing capability of the terminal to perform blind decoding on the PDCCH within a first unit time and a maximum processing capability that the terminal performs blind decoding on the PDCCH within a second unit time; the first unit time is greater than the second unit time; and the determination unit 502 is configured to determine configuration information of the terminal according to the PDCCH blind decoding capability information reported by the terminal; wherein the configuration information is used to instruct the terminal to perform blind decoding on the PDCCH.

Further, as shown in FIG. 8, the network device 500 may include a sending unit 503, wherein:

the sending unit 503 is configured to send the configuration information to the terminal; wherein the configuration information is used to instruct the terminal to perform PDCCH blind decoding, and the configuration information includes at least one of: time resource information of PDCCH blind decoding, frequency domain resource information, DCI format information, PDCCH candidate number information, and PDCCH aggregation level information.

Optionally, the sending unit 503 is configured to send control information to the terminal on PDCCH candidates on which blind decoding is to be performed by the terminal.

Optionally, the PDCCH blind decoding capability information is used to indicate a maximum number of blind decodings that the terminal is capable within the first unit time, and a maximum number of blind decodings that the terminal is capable within the second unit time.

Optionally, the first unit time includes at least one of: at least one slot, at least one subframe, and an absolute time unit.

Optionally, the second unit time includes at least one of: at least one mini-slot, and at least one OFDM symbol.

Optionally, the PDCCH blind decoding capability information of the terminal is dependent on the processing delay capability information of the terminal; wherein the processing delay capability information of the terminal is: a minimum time interval between a downlink signal reception and the corresponding uplink feedback which are processed by the terminal, and/or, a minimum time interval between an uplink scheduling and the corresponding uplink signal transmission which are processed by the terminal.

Further optionally, the time interval includes at least one of: the number of OFDMs, the number of mini-slots, the number of slots, and the number of subframes.

Optionally, the PDCCH blind decoding capability information of the terminal is dependent on subcarrier spacing and/or OFDM symbol length of the system which the terminal is communicating with.

It should be noted that the functional descriptions of all the functional modules can refer to relevant contents of corresponding steps involved in the above method embodiment, and will not be repeated here.

An embodiment of the present disclosure further provides a network device which includes a processor, a storage, and a program stored on the storage and capable of running on the processor. The program implements, when executed by the processor, the processes of the above information determining method embodiment, and can achieve the same technical effects, which will not be repeated here in order to avoid repetition.

An embodiment of the present disclosure further provides a computer readable storage medium. The computer readable storage medium stores thereon a program which implements, when executed by a processor, the processes of the above information determining method embodiment, and can achieve the same technical effects, which will not be repeated here in order to avoid repetition. The computer readable storage medium may be a Read-Only Memory (ROM), a Random Access Memory (RAM), a magnetic disk or an optical disk or the like.

Figure 9:
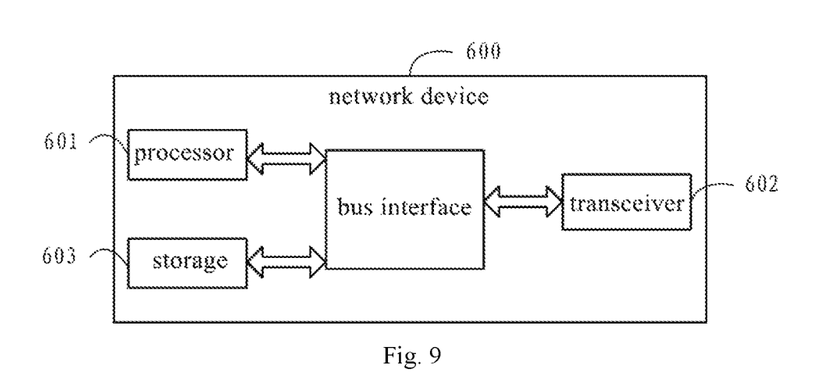
FIG. 9 is a schematic structural diagram of another network device according to an embodiment of the present disclosure.

With an integrated unit, an embodiment of the present disclosure further provides a network device, such as a base station. FIG. 9 is a structural diagram of the network device to which the embodiment of the present disclosure is applied, and which can implement the details of the information determining method provided in the above method embodiment, and achieve the same effects. As shown in FIG. 9, the network side device 600 includes a processor 601, a transceiver 602, a storage 603 and a bus interface, wherein:

in the embodiment of the present disclosure, the network device 600 further includes a computer program stored on the storage 603 and capable of running on the processor 601. When executed by the processor, the computer program implements the following steps:

Step 1: receiving PDCCH blind decoding capability information of a terminal reported by the terminal; wherein the PDCCH blind decoding capability information further indicates a maximum processing capability of the terminal to perform blind decoding on the PDCCH within a first unit time and a maximum processing capability that the terminal performs blind decoding on the PDCCH within a second unit time; the first unit time consists of at least two second unit times; and Step 2: determining configuration information of the terminal according to the PDCCH blind decoding capability information reported by the terminal; wherein the configuration information is used to instruct the terminal to perform blind decoding on the PDCCH.

In FIG. 6, the bus architecture may include any number of interconnected buses and bridges, which are specifically linked by various circuits including one or more processors represented by the processor 601 and storages represented by the storage 603. The bus architecture can also link various other circuits such as peripherals, voltage regulators, and power management circuits, which are well known in the art and, therefore, will not be further described herein. The bus interface provides an interface. The transceiver 602 may be multiple components, i.e., including a transmitter and a receiver, providing units for communicating with various other devices on a transmission medium.

The processor 601 is responsible for managing the bus architecture and general processing, and the storage 603 may store data used by the processor 601 in performing operations.

Optionally, when executed by the processor 603, the computer program may also implement the following step:

Step 3: sending the configuration information to the terminal; wherein the configuration information is used to instruct the terminal to perform PDCCH blind decoding, and the configuration information includes at least one of: time resource information of PDCCH blind decoding, frequency domain resource information, DCI format information, PDCCH candidate number information, and PDCCH aggregation level information.

Optionally, when executed by the processor 603, the computer program may also implement the following step:

Step 4: sending control information to the terminal on PDCCH candidates on which blind decoding is to be performed by the terminal.

Optionally, the PDCCH blind decoding capability information is used to indicate a maximum number of blind decodings that the terminal is capable within the first unit time, and a maximum number of blind decodings that the terminal is capable within the second unit time.

Optionally, the first unit time includes at least one of: at least one slot, at least one subframe, and an absolute time unit.

Optionally, the second unit time includes at least one of: at least one mini-slot, and at least one OFDM symbol.

Optionally, the PDCCH blind decoding capability information of the terminal is dependent on the processing delay capability information of the terminal; wherein the processing delay capability information of the terminal is: a minimum time interval between a downlink signal reception and the corresponding uplink feedback which are processed by the terminal, and/or, a minimum time interval between an uplink scheduling and the corresponding uplink signal transmission which are processed by the terminal.

Further optionally, the time interval includes at least one of: the number of OFDMs, the number of mini-slots, the number of slots, and the number of subframes.

Optionally, the PDCCH blind decoding capability information of the terminal is dependent on subcarrier spacing and/or OFDM symbol length of the system which the terminal is communicating with.

For the analysis of the related contents in Steps 1 to 4 above, reference may be made to the foregoing method embodiment, and details are not repeated here. In addition, the network device can implement various processes implemented by the network device in the foregoing embodiment. To avoid repetition, details are not described here again.

As for the network device according to the embodiment of the present disclosure, when receiving the PDCCH blind decoding capability information of a terminal defined by the terminal itself, the network device can learn the accurate PDCCH blind decoding capability of the terminal so that it can configure reasonable blind decoding behaviors of different terminals according to the actual PDCCH blind decoding capabilities of different terminals, thereby supporting diverse terminal capabilities and adapting to different actual requirements.

Those skilled in the art should understand that the embodiments of the present disclosure may be provided as methods, systems, or computer program products. Therefore, the embodiments of the present disclosure may take the form of an entirely hardware embodiment, an entirely software embodiment, or embodiments combining software and hardware aspects. Moreover, the embodiments of the present disclosure may take the form of a computer program product implemented on one or more computer-usable storage media (including but not limited to magnetic disk storage, CD-ROM, optical storage, etc.) containing computer-usable program codes.

The embodiments of the present disclosure are described with reference to flowcharts and/or block diagrams of methods, devices (systems), and computer program products according to the embodiments of the present disclosure. It will be appreciated that each process and/or block in the flowcharts and/or block diagrams, and combinations of processes and blocks in the flowcharts and block diagrams can be implemented by computer program instructions. These computer program instructions may be provided to a processor of a general purpose computer, dedicated computer, embedded processor, or other programmable data processing device to produce a machine, such that the instructions executed by the processor of the computer or other programmable data processing device generate means for implementing the functions specified in one or more of the processes in the flowcharts and/or one or more of the blocks in the block diagrams.

These computer program instructions may also be stored in a computer-readable storage capable of directing a computer or other programmable data processing device to work in a specific manner, such that the instructions stored in the computer-readable storage produce a manufactured article including the instruction means which implements the functions specified in one or more of the processes in the flowcharts and/or one or more of the blocks in the block diagrams.

These computer program instructions may also be loaded on a computer or other programmable data processing device, so that a series of operation steps are performed on the computer or other programmable device to produce a computer-implemented process, so that the instructions executed on the computer or other programmable device provide the steps for implementing the functions specified in one or more of the processes in the flowcharts and/or one or more of the blocks in the block diagrams.

Obviously, those skilled in the art can make various modifications and variations to the embodiments of the present disclosure without departing from the scope of the present disclosure. In this way, if these modifications and variations of the embodiments of the present disclosure fall within the scope of the claims of the present disclosure and their equivalent technologies, the present disclosure also intends to include these modifications and variations.

What is claimed is:

1. An information reporting method applied to a terminal, comprising:
   determining a first physical downlink control channel (PDCCH) blind decoding capability information of the terminal; wherein the first PDCCH blind decoding capability information indicates a maximum processing capability of the terminal to perform blind decoding on the PDCCH within a first unit time;
   determining a second PDCCH blind decoding capability information, wherein the second PDCCH blind decoding capability information indicates a maximum processing capability of the terminal to perform blind decoding on the PDCCH within a second unit time, the first unit time is greater than the second unit time; and
   reporting the second PDCCH blind decoding capability information to a network device,
   wherein the first PDCCH blind decoding capability information of the terminal is dependent on subcarrier spacing of the system which the terminal is communicating with, and the second PDCCH blind decoding capability information of the terminal is dependent on subcarrier spacing of the system which the terminal is communicating with.

2. The method according to claim 1, wherein, after the reporting the second PDCCH blind decoding capability information to the network device, the method further comprises:
   receiving configuration information sent by the network device; wherein the configuration information is used to instruct the terminal to perform PDCCH blind decoding, and the configuration information comprises at least one of: time resource information of PDCCH blind decoding, frequency domain resource information, downlink control information (DCI) format information, PDCCH candidate number information, and PDCCH aggregation level information; and
   performing PDCCH blind decoding according to the configuration information of PDCCH blind decoding.

3. The method according to claim 1, wherein the first PDCCH blind decoding capability information indicates a maximum number of blind decodings that the terminal is capable within the first unit time, and the second PDCCH blind decoding capability information indicates a maximum number of blind decodings that the terminal is capable within the second unit time.

4. The method according to claim 1, wherein the first unit time comprises at least one of: at least one slot, at least one subframe, and an absolute time unit; or,
   the second unit time comprises at least one of: at least one mini-slot, and at least one OFDM symbol.

5. The method according to claim 1, further comprising:
   reporting the first PDCCH blind decoding capability information to the network device.

6. The method according to claim 1, wherein the first PDCCH blind decoding capability information and the second PDCCH blind decoding capability information of the terminal is dependent on the processing delay capability information of the terminal;
   wherein the processing delay capability information of the terminal is: the minimum time interval between a downlink signal reception and the corresponding uplink feedback which are processed by the terminal, and/or, a minimum time interval between an uplink scheduling and the corresponding uplink signal transmission which are processed by the terminal.

7. The method according to claim 6, wherein the time interval comprises at least one of: the number of orthogonal frequency division multiplexings (OFDMs) symbols, the number of mini-slots, the number of slots, and the number of subframes.

8. A network device, comprising a processor, a storage, and a program stored on the storage and capable of running on the processor, wherein the processor implements the following steps when executing the program:
   receiving a second PDCCH blind decoding capability information reported by a terminal; wherein the second PDCCH blind decoding capability information indicates a maximum processing capability of the terminal to perform blind decoding on the PDCCH within a second unit time, the second unit time is less than a first unit time, and the second unit time corresponds to the second PDCCH blind decoding capability information of the terminal; and
   determining configuration information of the terminal according to the second PDCCH blind decoding capability information reported by the terminal; wherein the configuration information is used to instruct the terminal to perform blind decoding on the PDCCH;
   the second PDCCH blind decoding capability information of the terminal is dependent on subcarrier spacing of the system which the terminal is communicating with.

9. The network device according to claim 8, wherein the steps implemented by the processor when executing the program further comprise:
   sending the configuration information to the terminal; wherein the configuration information is used to instruct the terminal to perform PDCCH blind decoding, and the configuration information comprises at least one of: time resource information of PDCCH blind decoding, frequency domain resource information, DCI format information, PDCCH candidate number information, and PDCCH aggregation level information.

10. The network device according to claim 8, wherein the steps implemented by the processor when executing the program further comprise:
    sending control information to the terminal on PDCCH candidates on which blind decoding is to be performed by the terminal.

11. The network device according to claim 8, wherein a first PDCCH blind decoding capability information indicates a maximum number of blind decodings that the terminal is capable within the first unit time, the second PDCCH blind decoding capability information indicates a maximum number of blind decodings that the terminal is capable within the second unit time.

12. The network device according to claim 8, wherein the first unit time comprises at least one of: at least one slot, at least one subframe, and an absolute time unit; or,
    the second unit time comprises at least one of: at least one mini-slot, and at least one OFDM symbol.

13. The network device according to claim 8, wherein the PDCCH blind decoding capability information further indicates a maximum processing capability of the terminal to perform blind decoding on the PDCCH within a second unit time; the first unit time is greater than the second unit time.

14. The network device according to claim 8, wherein the first PDCCH blind decoding capability information and the second PDCCH blind decoding capability information of the terminal is dependent on the processing delay capability information of the terminal;

wherein the processing delay capability information of the terminal is: the minimum time interval between a downlink signal reception and the corresponding uplink feedback which are processed by the terminal, and/or, the minimum time interval between an uplink scheduling and the corresponding uplink signal transmission which are processed by the terminal;

wherein the time interval comprises at least one of: the number of OFDM symbols, the number of mini-slots, the number of slots, and the number of subframes.

15. A terminal, comprising a processor, a storage, and a program stored on the storage and capable of running on the processor, wherein the processor implements, when executing the program, the steps of:

determining a first physical downlink control channel (PDCCH) blind decoding capability information of the terminal; wherein the first PDCCH blind decoding capability information indicates a maximum processing capability of the terminal to perform blind decoding on the PDCCH within a first unit time;

determining a second PDCCH blind decoding capability information, wherein the second PDCCH blind decoding capability information indicates a maximum processing capability of the terminal to perform blind decoding on the PDCCH within a second unit time, the first unit time is greater than the second unit time; and     reporting the second PDCCH blind decoding capability information to a network device,     wherein the first PDCCH blind decoding capability information of the terminal is related to a subcarrier interval of a system in which the terminal is communicating with, and the second PDCCH blind decoding capability information of the terminal is dependent on subcarrier spacing of the system which the terminal is communicating with.

16. The terminal according to claim 15, wherein the steps implemented by the processor when executing the program further comprise:

receiving configuration information sent by the network device; wherein the configuration information is used to instruct the terminal to perform PDCCH blind decoding, and the configuration information comprises at least one of: time resource information of PDCCH blind decoding, frequency domain resource information, downlink control information (DCI) format information, PDCCH candidate number information, and PDCCH aggregation level information; and     performing PDCCH blind decoding according to the configuration information of PDCCH blind decoding.

17. The terminal according to claim 15, wherein the first PDCCH blind decoding capability information indicates a maximum number of blind decodings that the terminal is capable within the first unit time, and the second PDCCH blind decoding capability information indicates a maximum number of blind decodings that the terminal is capable within the second unit time.

18. The terminal according to claim 15, wherein the first unit time comprises at least one of: at least one slot, at least one subframe, and an absolute time unit; or,     the second unit time comprises at least one of: at least one mini-slot, and at least one OFDM symbol.

19. The terminal according to claim 15, wherein the steps implemented by the processor when executing the program further comprise:

reporting the first PDCCH blind decoding capability information to the network device.

20. The terminal according to claim 15, wherein the first PDCCH blind decoding capability information and the second PDCCH blind decoding capability information of the terminal is dependent on the processing delay capability information of the terminal;

wherein the processing delay capability information of the terminal is: the minimum time interval between a downlink signal reception and the corresponding uplink feedback which are processed by the terminal, and/or, a minimum time interval between an uplink scheduling and the corresponding uplink signal transmission which are processed by the terminal.

\* \* \* \* \*